US010920955B2

(12) United States Patent
Belcher et al.

(10) Patent No.: US 10,920,955 B2
(45) Date of Patent: Feb. 16, 2021

(54) LAMP ASSEMBLY FOR A VEHICLE

(71) Applicant: SMR Patents S.à.r.l., Luxembourg (LU)

(72) Inventors: Simon Belcher, Lonsdale (AU); Jay Dickson, Lonsdale (AU)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

(21) Appl. No.: 16/204,565

(22) Filed: Nov. 29, 2018

(65) Prior Publication Data

US 2019/0093849 A1 Mar. 28, 2019

Related U.S. Application Data

(63) Continuation-in-part of application No. PCT/EP2017/063034, filed on May 30, 2017.

(51) Int. Cl.
| | |
|---|---|
| *F21V 9/00* | (2018.01) |
| *F21S 43/245* | (2018.01) |
| *F21S 43/14* | (2018.01) |
| *B60R 1/12* | (2006.01) |
| *F21S 43/237* | (2018.01) |
| *B60Q 1/26* | (2006.01) |

(Continued)

(52) U.S. Cl.
CPC .......... *F21S 43/245* (2018.01); *B60Q 1/2665* (2013.01); *B60R 1/1207* (2013.01); *F21S 43/14* (2018.01); *F21S 43/237* (2018.01); *F21S 43/249* (2018.01); *F21S 43/26* (2018.01); *F21S 43/27* (2018.01); *F21S 45/50* (2018.01); *F21W 2103/15* (2018.01); *F21W 2103/25* (2018.01)

(58) Field of Classification Search
CPC ....... F21W 2103/25; F21S 41/24; F21S 45/50
See application file for complete search history.

(56) References Cited

U.S. PATENT DOCUMENTS

| 9,656,601 B2 | 5/2017 | Evans et al. | |
|---|---|---|---|
| 2011/0001428 A1* | 1/2011 | Rodriguez Barros | ..................... B60Q 1/2665 315/77 |

(Continued)

FOREIGN PATENT DOCUMENTS

| DE | 102005013682 A1 | 9/2006 |
|---|---|---|
| DE | 102012211821 A1 | 6/2014 |

(Continued)

OTHER PUBLICATIONS

International Search Report dated Aug. 2, 2017 of International application No. PCT/EP2017/063034.

(Continued)

*Primary Examiner* — Matthew J. Peerce
(74) *Attorney, Agent, or Firm* — Jones Day

(57) ABSTRACT

A lamp assembly for a vehicle includes a housing, an outer lens partially covering the housing to define an enclosure between the housing and lens, a light emitting diode (LED) light source arranged in the enclosure, and a light guide forming part of the housing. The light guide may include a light receiving surface within the enclosure and a light emitting surface outside the enclosure so that light emitted from the LED light source is received by the light receiving surface of the light guide and directed toward the light emitting surface of the light guide and light is output from the light guide.

14 Claims, 5 Drawing Sheets

(51) Int. Cl.
*F21S 43/27* (2018.01)
*F21S 45/50* (2018.01)
*F21S 43/249* (2018.01)
*F21S 43/20* (2018.01)
*F21W 103/25* (2018.01)
*F21W 103/15* (2018.01)

(56) References Cited

U.S. PATENT DOCUMENTS

| 2011/0013411 A1* | 1/2011 | Sakiyama | B60Q 1/2665 |
| | | | 362/494 |
| 2017/0108191 A1* | 4/2017 | Nishihata | F21S 43/245 |
| 2017/0197542 A1* | 7/2017 | Belcher | F21S 43/26 |

FOREIGN PATENT DOCUMENTS

| EP | 2774814 A1 | 9/2014 |
| EP | 2803532 A1 | 11/2014 |

OTHER PUBLICATIONS

Written Opinion dated Aug. 2, 2017 of International application No. PCT/EP2017/063034.

* cited by examiner

LAMP ASSEMBLY FOR A VEHICLE

CROSS-REFERENCE TO RELATED APPLICATIONS

This application is a continuation-in-part of International Patent Application No. PCT/EP2017/063034, filed May 30, 2017, which claims the benefit of foreign priority to Australian Patent Application No. 2016902106, filed Jun. 1, 2016, each of which is hereby incorporated by reference in its entirety for all purposes.

TECHNICAL FIELD

The following description relates to lamp assemblies. For example, lamp assemblies for an exterior rear view assembly of a vehicle.

BACKGROUND

Automotive lighting arrangements are increasingly being used in vehicle rear view systems (such as exterior rear view mirror assemblies) as value added features required by automotive manufacturers. An example of this is rear view mirror assemblies that are manufactured with supplementary side direction indicators (or side turn signal indicator) lights, which are operated by the driver to signal their intention to change the direction in which the vehicle is proceeding. Light emitting diodes (LEDs) are also being used more frequently as the light source in these lighting arrangements.

It is desirable to provide a lighting arrangement which provides both a forward projecting light output (known as a cosmetic light due to it being for aesthetic rather than regulatory or compliance purposes) and a rear projecting light output (known as a compliance light) having a required photometric output for legal compliance purposes (for example, the requirements of Australian Design Rule 6/00-Direction Indicators).

Light emitting devices within rear vision assemblies that employ an internal light pipe, or a light pipe integrated into an exterior lens are known. It is also known to weld such light pipes to a rear housing to achieve both cosmetic and regulatory requirements. However, this solution may not always be possible due to packaging and design requirements.

SUMMARY

In one aspect, a lamp assembly for a vehicle includes a housing; an outer lens partially covering the housing to define an enclosure between the housing and lens; a light emitting diode (LED) light source arranged in the enclosure; and a light guide forming part of the housing, the light guide having a light receiving surface within the enclosure and a light emitting surface outside the enclosure, such that light emitted from the LED light source is received by the light receiving surface of the light guide and directed toward the light emitting surface of the light guide, such that light is output from the light guide.

The light may be output from the light guide with a substantially uniform luminance.

The light may be output from the light guide over a viewing angle of at least 55 degrees in a plane.

The plane may be a horizontal plane.

The light emitting surface of the light guide may include surface optics to diffuse light output from the light emitting surface.

The housing may be opaque.

The light guide may be clear.

The outer lens may include an opaque inner portion and a light transmissive outer portion, where the opaque inner portion includes an elongate opening to allow light to transmit through the outer portion, the lamp assembly further includes an elongate light pipe for guiding light from at least one light source to an elongate light emitting surface, where the elongate light pipe is housed within the enclosure such that the light emitting surface of the light pipe is adjacent to the elongate opening of the inner portion.

The lamp enclosure may be weatherproof.

BRIEF DESCRIPTION OF DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

DESCRIPTION OF EMBODIMENTS

Figure 1:
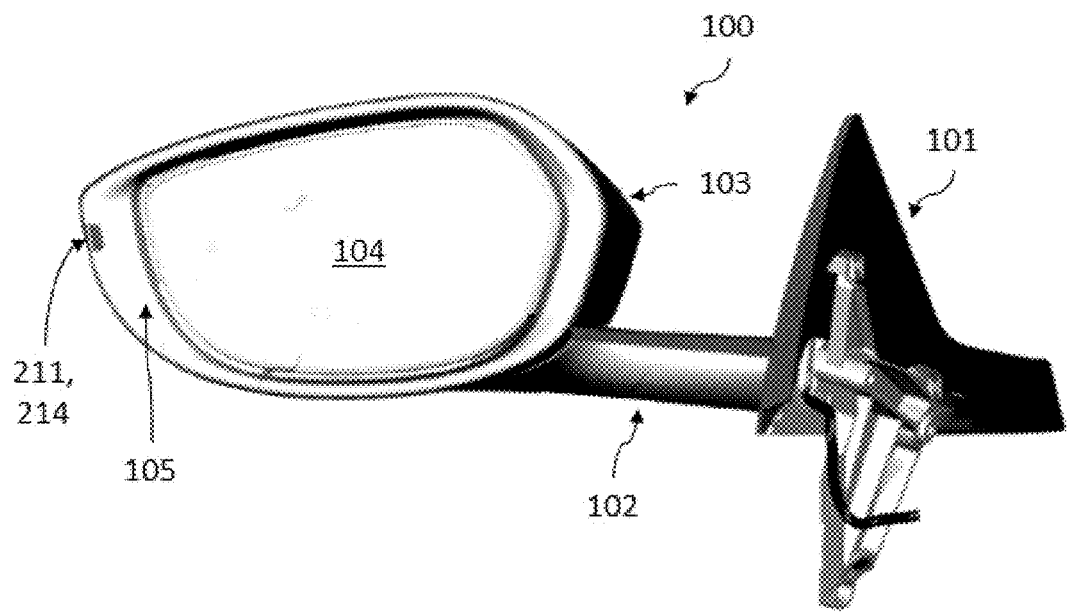
FIG. 1 is a rear perspective view of an example of a lamp assembly integrated into an exterior rear view mirror assembly.

Before explaining at least one example of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation-specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

Figure 2:
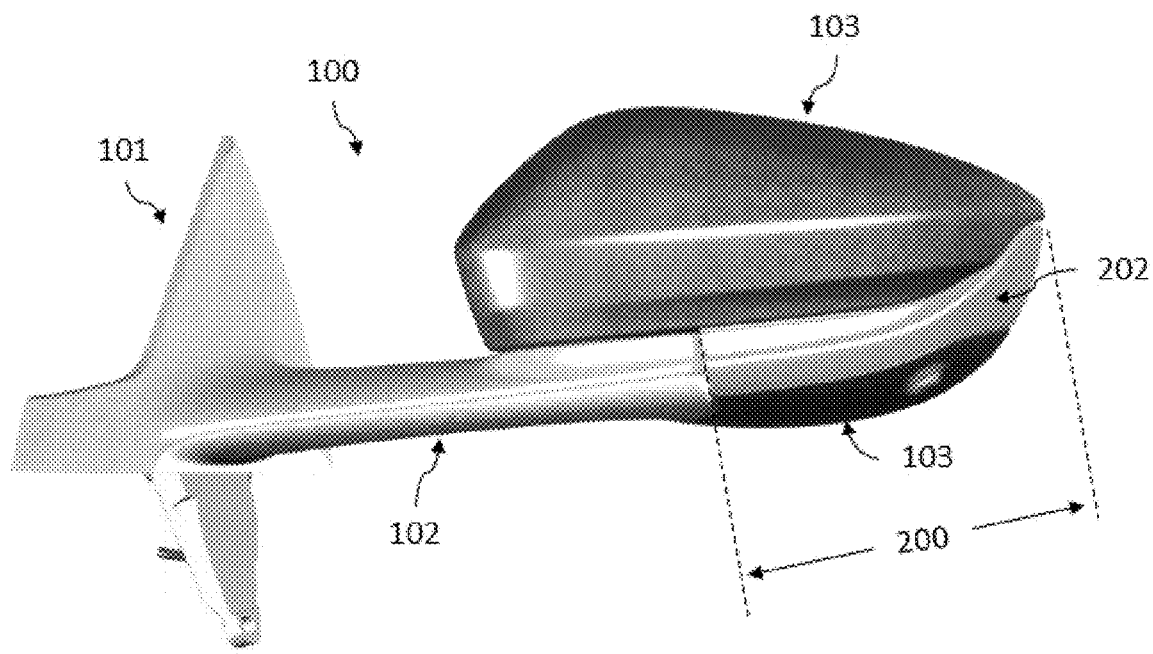
FIG. 2 is a front perspective view of the lamp assembly of FIG. 1.
Figure 3:
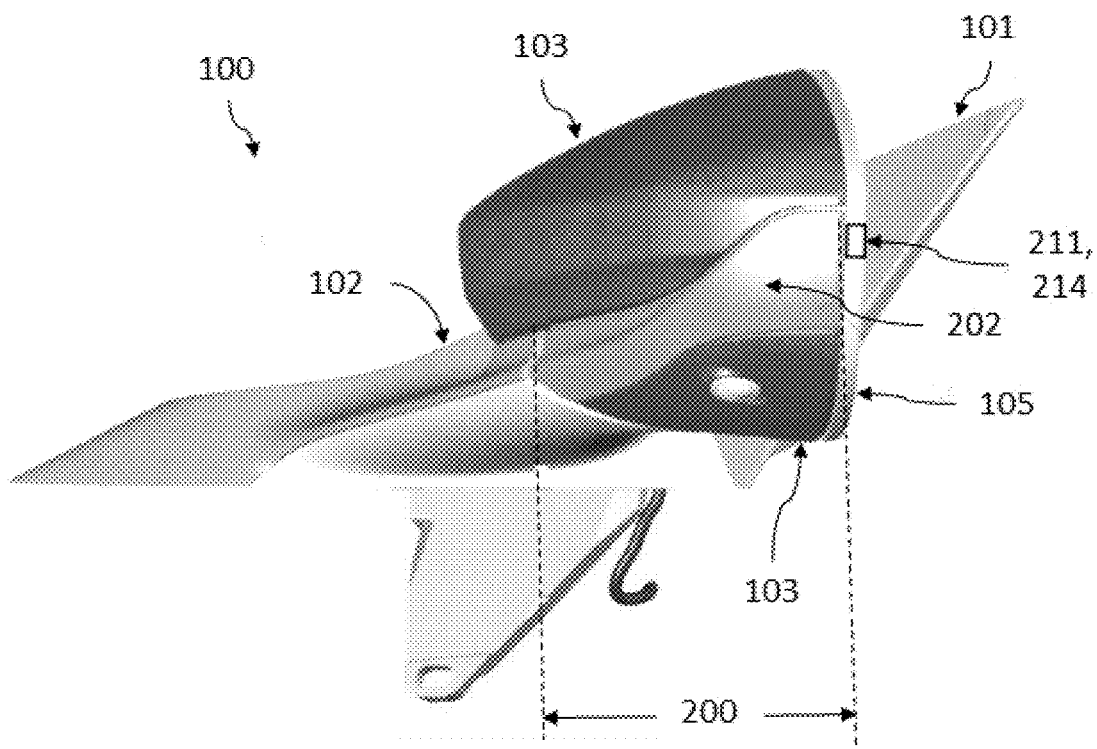
FIG. 3 is a side perspective view of the lamp assembly of FIG. 1.

Referring to FIGS. 1 to 3, a lamp assembly 200 integrates into an exterior rear view mirror assembly 100. The mirror assembly includes a vehicle mounting portion 101 for mounting the assembly to the side of a vehicle, and a base frame 102 in connection with the vehicle mounting portion 101 for supporting the remainder of the mirror assembly 100. The lamp assembly 200 is supported by the base frame 102, and is enclosed by an outer case 103, which also houses the rear view mirror 104 and mirror surround 105.

In an example, the lamp assembly 200 provides a cosmetic light configured to provide light output generally forward of the vehicle. The lamp assembly 200 also provides a compliance light configured to provide light output to an area, which may be required by law, including an outer lens 202 and a light guide 211. The lamp assembly 200 is the light gray area within the dark gray area of the outer case 103 in FIGS. 2 and 3 and extends between the dashed lines.

Figure 4:
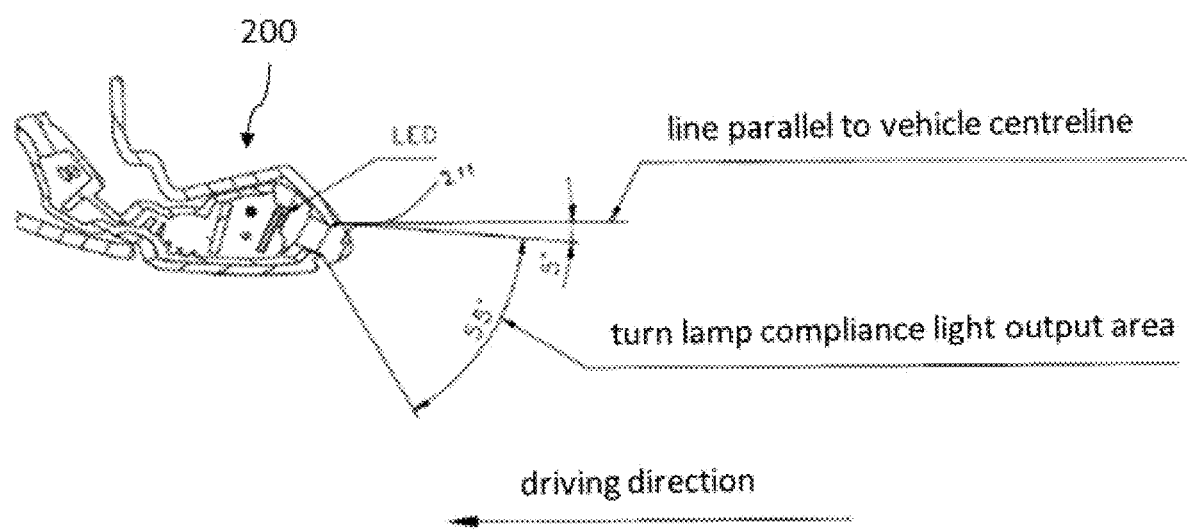
FIG. 4 is a cross sectional view of the lamp assembly including the minimum horizontal angle of light distribution in space to be provided by the compliance light.

Referring now to FIG. 4, a schematic top view of the minimum horizontal angle of light distribution in space may be provided by the compliance light, in order to comply with Australian Design Rule 6/00-Direction Indicators or other jurisdictions. It can be seen that the light output is required to be provided in a minimum 55 degree arc offset 5 degrees from a line parallel to the vehicle centerline. In this example, the compliance light may be configured to comply with these requirements.

Figure 5:
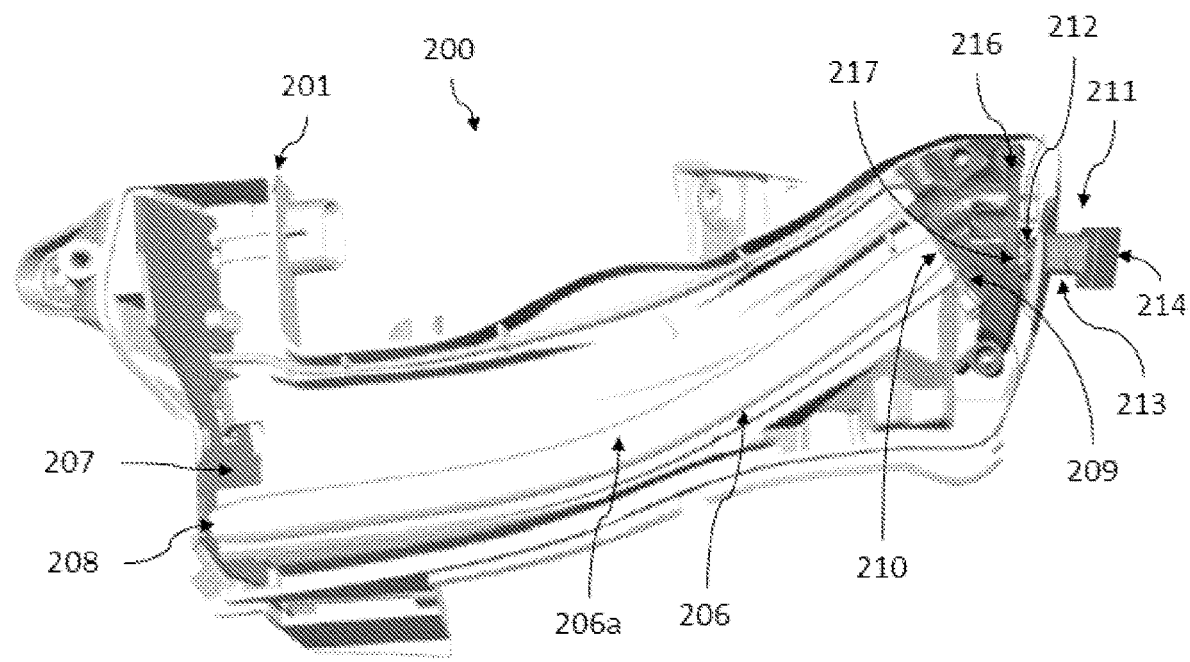
FIG. 5 is a front perspective view of the lamp assembly with its outer lens removed.
Figure 6:
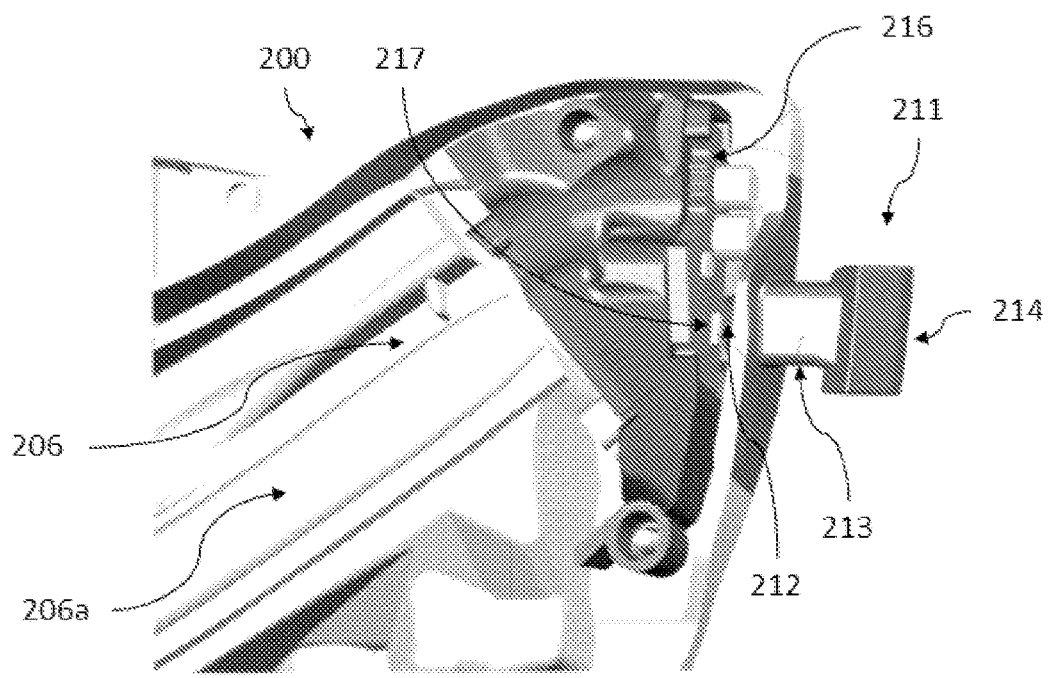
FIG. 6 is a detailed front perspective view of the lamp assembly of FIG. 5.

Referring now to FIGS. 5 and 6, the side of the lamp assembly 200 is facing away from the rear view mirror 104 of the mirror assembly 100 with its outer lens 202 being removed to show the lamp housing 201 and compliance light guide 211. In one example, the housing 201 and compliance light guide 211 are formed in a two shot injection molding process. First, the housing 201 is molded from black acrylonitrile butadiene styrene (ABS) or other suitable opaque substrate, then the compliance light guide 211 is overmolded using an acrylic (PMMA) or other suitable clear or transparent substrate.

In another example, the lamp housing 201 and compliance light guide 211 may instead be separate components welded together.

The lamp housing 201 supports and houses an elongate cosmetic light pipe 206, with an elongate light emitting surface 206a, the light pipe 206 being illuminated at its first and second ends by a first end PCB 207 and light source 208 and a second end PCB 209 and light source 210 respectively. The lamp housing 201 also supports and houses a PCB 216 and light source 217 for illuminating the compliance light guide 211.

In one example, the light sources 208, 209, 217 may be light emitting diodes (LEDs).

The cosmetic light pipe 206 may be manufactured from a clear plastic (such as PMM A) and may be adapted to be substantially transparent when in an un-lit state while being diffusive in a lit-state. When lit, light exits the light emitting surface 206a of the cosmetic light pipe 206 with substantially uniform luminous intensity along its length. This may be achieved by using surface optics along its length to distribute the light evenly along its length. In another example, the cosmetic light pipe 206 may be filled with light scattering particles, where most light rays that enter the light pipe 206 will encounter the light scattering particles that alter the direction of the rays. The effect of this light scattering is that light rays will spread throughout the light pipe 206 such that an even distribution of light output from the light emitting surface 206a occurs.

The light scattering particles may be titanium dioxide particles of sufficient size and concentration such that the light pipe 206 appears transparent when un-lit while providing a substantially uniform luminous intensity surface output when lit.

Referring to FIG. 6, the light source 217 may be immediately adjacent the light receiving surface 212 of the compliance light guide 211 such that light emitted from the light source is received by the light receiving surface 212 of the light guide 211, passes through the mid-section 213, and is directed toward the light emitting surface 214 of the light guide 211. That light may be output from the light guide 211 so that at least the minimum horizontal angle of light distribution in space is achieved.

In an example, the light emitting surface 214 may have surface optics present to diffuse light output from the light emitting surface.

In another example, the light guide 211 may be configured such that light is output from the light guide 211 with a substantially uniform luminance.

Figure 7:
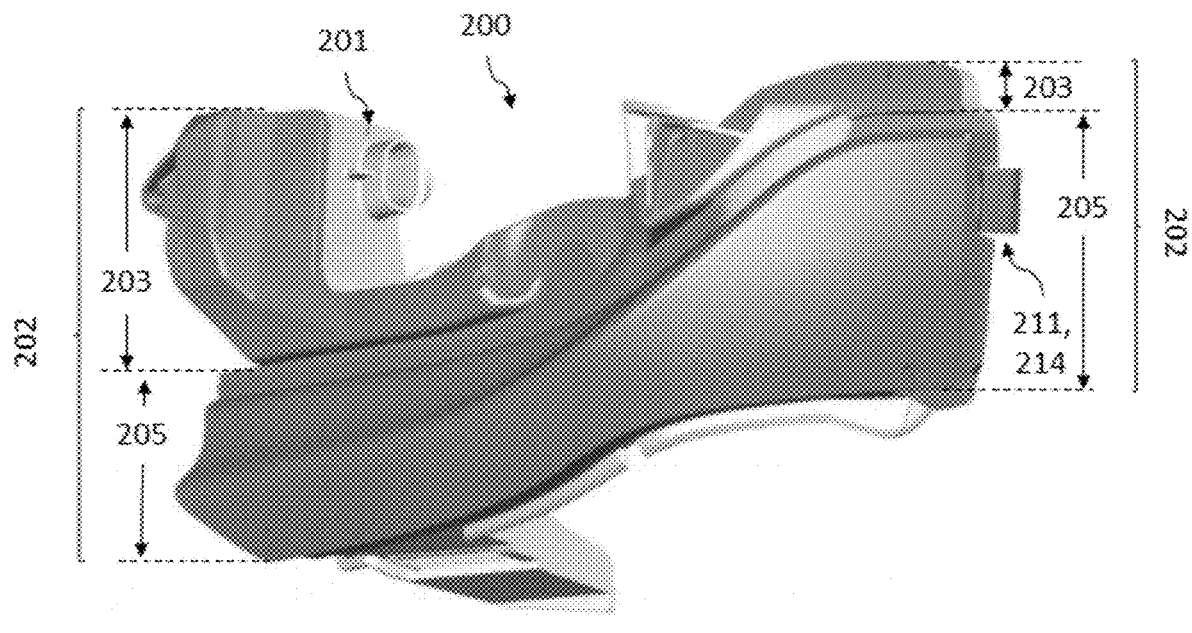
FIG. 7 is a front perspective view of the lamp assembly of FIG. 5 including the outer lens.
Figure 8:
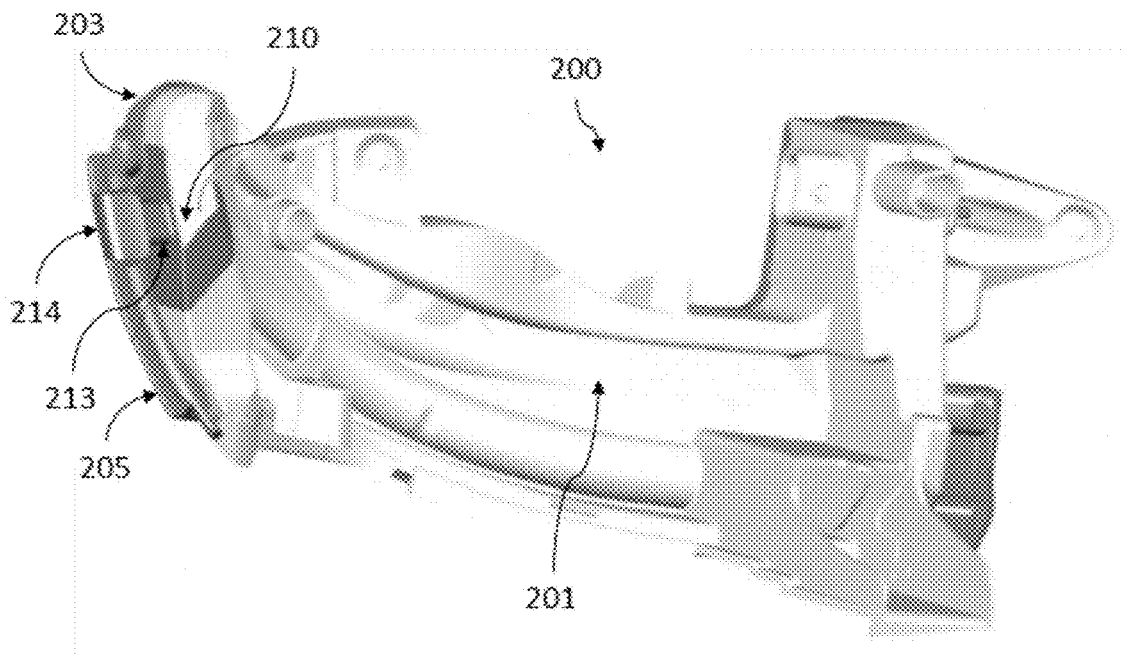
FIG. 8 is a rear perspective view of the lamp assembly of FIG. 7.
Figure 9:
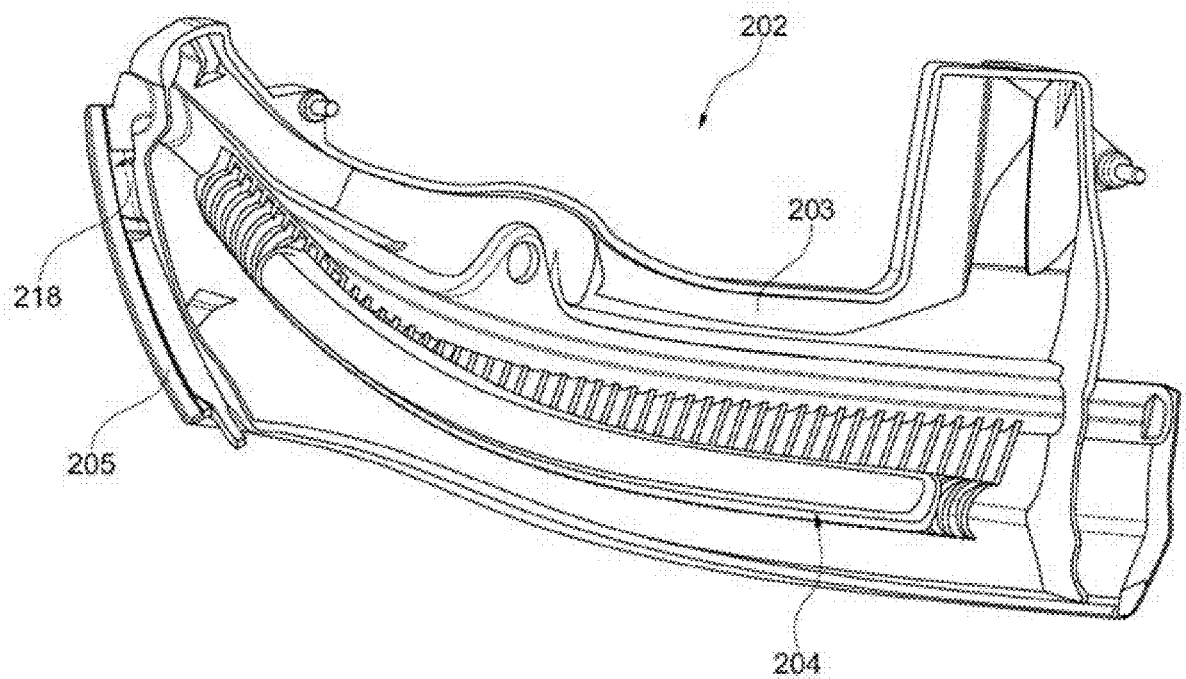
FIG. 9 is a rear perspective view of the outer lens.

Referring now to FIGS. 7 and 8, the lamp assembly 200 may include the outer lens 202 covering the housing 201, as shown in FIGS. 5 and 6. The outer lens 202 may be formed in a two shot injection molding process including an opaque inner portion 203 and a light transmissive outer portion 205. The dimensions of the opaque inner portion 203 and the light transmissive outer portion 205 visible to the outside of the lamp assembly 200 are indicated by the dashed lines on both sides of the lamp assembly 200. The light transmissive outer portion 205 may be arranged on top of the opaque inner portion 203. As best shown in FIG. 9, the opaque inner portion 203 may include an elongate opening 204 to allow light emitted from the adjacent light emitting surface 206a of the light pipe 206 (not shown here, see FIGS. 5 and 6) to transmit through the light transmissive outer portion 205 covering the elongate opening 204. The opaque inner portion 203 may be manufactured from an opaque plastic (such as ABS), and the light transmissive outer portion 205 may be manufactured from a clear or tinted plastic (such as PMMA).

In another example, the outer lens 202 may be a single component having an opaque coating on an inner surface formed by example by applying paint or a thin film coating. The light transmissive window 205 may be formed by etching away the opaque coating or masking the area before coating.

The outer lens 202 and housing 201 (including the overmolded compliance light guide 211) may be welded together using hot plate welding, as shown in FIG. 7, and may define a sealed, weatherproof enclosure housing the cosmetic light pipe 21, PCBs 207, 209, 216 and light sources 208, 210, 217.

Referring back to FIGS. 2 and 3, the exterior rear view mirror assembly 100 may be configured so that the light receiving surface 212 of the compliance light guide 211 is within the enclosure, and the light emitting surface of the compliance light guide 211 is outside the enclosure, so that the only externally visible components of the lamp assembly 200 are the outer lens 202 and the light emitting surface 214 of the compliance light guide 211. It will be appreciated that the co-molding or welding of the compliance light guide 211 to the housing 201 allows for it to be an external feature while the enclosure remains fully sealed.

As best seen in FIG. 5, the compliance light guide 211 features a mid-section 213 with a reduced cross sectional area. As shown in FIG. 9, the outer lens 202 comprising the opaque portion 203 and the light transmissive outer portion 205 features a complimentary cut out 218, wherein when the outer lens 202 is welded to the lamp housing 201 and compliance light guide 211 to form the sealed enclosure, the mid-section 213 nests within the cut out 218. The mirror surround 105 has a similar cut out (see FIG. 1) which also encloses the mid-section 213. such that the only visible component of the compliance light guide is the light emitting surface 214.

Figure 10:
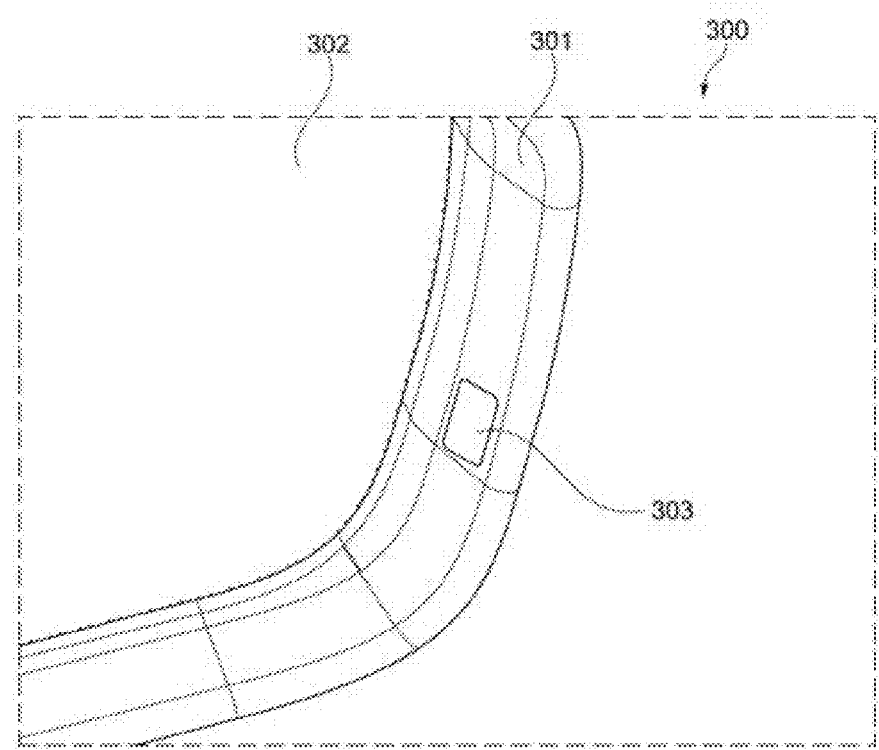
FIG. 10 is a rear perspective view of an example of a lamp assembly integrated into an exterior rear view mirror assembly.

Referring now to FIG. 10, where there is shown a rear perspective view of an exterior rear view mirror assembly 300 according to an alternative embodiment comprising a rear view mirror 302 and a mirror surround 301. This embodiment includes the additional feature of a compliance light guide with a second light emitting surface 303 which is directed toward the driver of the vehicle and employed as a tell-tale light to notify the driver that the compliance light is illuminated.

As will be appreciated by those skilled in the art, it is possible for the cosmetic and compliance lights to be illuminated individually. For instance, the cosmetic light may instead be used as an "always on" clearance light to provide a visual indication to oncoming traffic as to the width of the vehicle.

Throughout the specification and the claims, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent presently preferred embodiments of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

For instance, while in the examples shown, the lamp assembly 200 was shown and described being integrated into an exterior rear view mirror of a vehicle, it could also be integrated into any other type of exterior rear view system such as an exterior rear view camera pod.

The following claims are provisional claims only, and are provided as examples of possible claims and are not intended to limit the scope of what may be claimed in any future patent applications based on the present application. Integers may be added to or omitted from the example claims at a later date so as to further define or redefine the invention.

What is claimed is:

1. A lamp assembly for a vehicle, comprising:
   a housing;
   an outer lens comprising an opaque inner portion and a light transmissive outer portion which partially covers the housing to define an enclosure between the housing and the outer lens;
   a pair of light emitting diode (LED) light sources arranged in the enclosure; and
   a light guide forming part of the housing, the light guide having a light receiving surface within the enclosure and a light emitting surface outside the enclosure so that light emitted from the LED light sources is received by the light receiving surface of the light guide and directed toward the light emitting surface of the light guide, and light is output from the light guide;
   an elongated light pipe for guiding light from the LED light sources; and
   an elongated light emitting surface being housed within the enclosure,
   wherein the opaque inner portion of the outer lens comprises an elongated opening to allow light to transmit through the light transmissive outer portion by the elongated light pipe for guiding light from the LED light sources to the elongated light emitting surface, and the elongated light emitting surface is adjacent to the elongated opening of the inner portion,
   wherein the elongated light pipe has a substantially uniform luminous intensity along its length, the substantially uniform luminous intensity being achieved by the elongated light pipe being filled with light scattering particles where most light rays that enter the elongated light pipe will encounter the light scattering particles that alter the direction of the light rays from a light propagation direction, and the light rays are spread throughout the light pipe so that an even distribution of light output from the light emitting surface occurs,
   wherein the LED light sources are arranged at far opposite ends of the light pipe, and
   wherein the housing and the light guide are either formed in a two-shot injection molding process or welded together, the outer lens is welded to the housing to define the sealed enclosure, and the light guide extends through the sealed enclosure so that a portion of the light guide is inside the sealed enclosure.

2. The lamp assembly of claim 1, wherein the light is output from the light guide with a substantially uniform luminance.

3. The lamp assembly of claim 1, wherein the light is output from the light guide so that it can be viewed in a region spanning an angle of at least 55 degrees in a plane.

4. The lamp assembly of claim 3, wherein the plane is a horizontal plane.

5. The lamp assembly of claim 1, wherein the light emitting surface of the light guide includes surface optics to diffuse light output from the light emitting surface.

6. The lamp assembly of claim 1, wherein the housing is opaque.

7. The lamp assembly of claim 1, wherein the light guide is clear.

8. The lamp assembly of claim 1, wherein the lamp enclosure is weatherproof.

9. The lamp assembly of claim 1, wherein the elongated light pipe has a substantially uniform luminous intensity along its length.

10. The lamp assembly of claim 9, wherein the substantially uniform luminous intensity is achieved by
using surface optics to distribute the light evenly along the length of the elongated light pipe, or
the elongated light pipe being filled with light scattering particles where most light rays that enter the elongated light pipe will encounter the light scattering particles that alter the direction of the light rays, and the light rays are spread throughout the light pipe so that an even distribution of light output from the light emitting surface occurs.

11. The lamp assembly of claim 1, wherein the elongated light pipe is illuminated at a first and second end by a first end PCB and a light source and a second end PCB.

12. A lamp assembly for a vehicle, comprising:
a housing;
an outer lens comprising an opaque inner portion and a light transmissive outer portion which partially covers the housing to define an enclosure between the housing and the outer lens;
a pair of light emitting diode (LED) light sources arranged in the enclosure; and
a light guide forming part of the housing, the light guide having a light receiving surface within the enclosure and a light emitting surface outside the enclosure so that light emitted from the LED light sources is received by the light receiving surface of the light guide and directed toward the light emitting surface of the light guide, and light is output from the light guide;
an elongated light pipe for guiding light from the LED light sources; and
an elongated light emitting surface being housed within the enclosure,
wherein the opaque inner portion of the outer lens comprises an elongated opening to allow light to transmit through the light transmissive outer portion by the elongated light pipe for guiding light from the LED light sources to the elongated light emitting surface, and the elongated light emitting surface is adjacent to the elongated opening of the inner portion,
wherein the LED light sources are arranged at far opposite ends of the light pipe, the light pipe being without any branching ends, and
wherein the housing and the light guide are either formed in a two-shot injection molding process or welded together, the outer lens is welded to the housing to define the sealed enclosure, and the light guide extends through the sealed enclosure so that a portion of the light guide is inside the sealed enclosure.

13. A lamp assembly for a vehicle, comprising:
a housing;
an outer lens comprising an opaque inner portion and a light transmissive outer portion which partially covers the housing to define an enclosure between the housing and the outer lens;
a pair of light emitting diode (LED) light sources arranged in the enclosure; and
a light guide forming part of the housing, the light guide having a light receiving surface within the enclosure and a light emitting surface outside the enclosure so that light emitted from the LED light sources is received by the light receiving surface of the light guide and directed toward the light emitting surface of the light guide, and light is output from the light guide;
an elongated light pipe for guiding light from the LED light sources; and
an elongated light emitting surface being housed within the enclosure,
wherein the opaque inner portion of the outer lens comprises an elongated opening to allow light to transmit through the light transmissive outer portion by the elongated light pipe for guiding light from the LED light sources to the elongated light emitting surface, and the elongated light emitting surface is adjacent to the elongated opening of the inner portion,
wherein the LED light sources propagate in opposite direction crossing each other along a total length of the light pipe, and
wherein the housing and the light guide are either formed in a two-shot injection molding process or welded together, the outer lens is welded to the housing to define the sealed enclosure, and the light guide extends through the sealed enclosure so that a portion of the light guide is inside the sealed enclosure.

14. A lamp assembly for a vehicle, comprising:
a housing;
an outer lens comprising an opaque inner portion and a light transmissive outer portion which partially covers the housing to define an enclosure between the housing and the outer lens;
a pair of light emitting diode (LED) light sources arranged in the enclosure; and
a light guide forming part of the housing, the light guide having a light receiving surface within the enclosure and a light emitting surface outside the enclosure so that light emitted from the LED light sources is received by the light receiving surface of the light guide and directed toward the light emitting surface of the light guide, and light is output from the light guide;
an elongated light pipe for guiding light from the LED light sources; and
an elongated light emitting surface being housed within the enclosure,
wherein the opaque inner portion of the outer lens comprises an elongated opening to allow light to transmit through the light transmissive outer portion by the elongated light pipe for guiding light from the LED light sources to the elongated light emitting surface, and the elongated light emitting surface is adjacent to the elongated opening of the inner portion, wherein the LED light sources are arranged at far opposite ends of the light pipe, the light pipe being without any branching ends, wherein the LED light sources propagate in opposite direction crossing each other along a total length of the light pipe, and wherein the housing and the light guide are either formed in a two-shot injection molding process or welded together, the outer lens is welded to the housing to define the sealed enclosure, and the light guide extends through the sealed enclosure so that a portion of the light guide is inside the sealed enclosure.

* * * * *

UNITED STATES PATENT AND TRADEMARK OFFICE
CERTIFICATE OF CORRECTION

Page 1 of 1

PATENT NO. : 10,920,955 B2
APPLICATION NO. : 16/204565
DATED : February 16, 2021
INVENTOR(S) : Simon Belcher and Jay Dickson It is certified that error appears in the above-identified patent and that said Letters Patent is hereby corrected as shown below:

On the Title Page

Insert (item (30), Foreign Application Priority Data):
-- Jun. 1, 2016 (AU) 2016902106 --

Signed and Sealed this
Third Day of October, 2023

Katherine Kelly Vidal
*Director of the United States Patent and Trademark Office*